United States Patent
Foo et al.

(10) Patent No.: US 7,650,387 B2
(45) Date of Patent: Jan. 19, 2010

(54) METHOD AND SYSTEM FOR MANAGING STORAGE ON A SHARED STORAGE SPACE

(75) Inventors: Ian Foo, Raleigh, NC (US); Jeremy E. Stieglitz, Menlo Park, CA (US); Frederick J. Baker, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 599 days.

(21) Appl. No.: 11/280,556

(22) Filed: Nov. 15, 2005

(65) Prior Publication Data
US 2007/0112930 A1    May 17, 2007

(51) Int. Cl.
  *G06F 15/167* (2006.01)
(52) U.S. Cl. .............. 709/214; 709/216; 709/217; 709/219; 709/223
(58) Field of Classification Search .......... 709/214
See application file for complete search history.

(56) References Cited

U.S. PATENT DOCUMENTS

| 6,839,741 | B1 | 1/2005 | Tsai | |
| 7,305,430 | B2* | 12/2007 | Choubey et al. | 709/203 |
| 2003/0025697 | A1* | 2/2003 | Gupta | 345/442 |
| 2004/0024810 | A1* | 2/2004 | Choubey et al. | 709/203 |
| 2004/0034688 | A1* | 2/2004 | Dunn | 709/206 |
| 2008/0052324 | A1* | 2/2008 | Choubey et al. | 707/201 |

* cited by examiner

*Primary Examiner*—Firmin Backer
*Assistant Examiner*—Arvin Eskandarnia
(74) *Attorney, Agent, or Firm*—Trellis IP Law Group, PC

(57) ABSTRACT

A method, a system, a machine-readable medium, and an apparatus for managing storage on a shared storage space, for example, on an email server, are provided. A plurality of emails is compared. If the content of each of the plurality of emails is the same, then a single copy is stored on the email server. Further, each recipient of the plurality of emails is enabled access to the stored email via a link to the single copy. Additionally, one or more attachments of the plurality of emails are compared. If an attachment is the same in each of the plurality of emails, then it is stored as a single copy. Further, a link is inserted in each of the plurality of emails, enabling access to the attachment from the single copy.

14 Claims, 6 Drawing Sheets

METHOD AND SYSTEM FOR MANAGING STORAGE ON A SHARED STORAGE SPACE

BACKGROUND OF THE INVENTION

1. Field of Invention

Embodiments of the invention relate in general to managing storage requirements. More specifically, embodiments of the invention relate to methods and systems for managing the storage on a shared storage space.

2. Description of the Background Art

Electronic mail or email has become an accepted and popular method of personal and official communication. Further, several attachments can be sent with an email. Attachments are separate documents or files that are sent along with the body of the email. These attachments can be music files, images, spreadsheets, word processor documents, and so forth.

An email is transmitted from the email server of the sender to the email server of the recipient. The email, along with its attachments, if there are any, is then stored in the email server till it is accessed and removed by the recipient. Hence, an email requires storage space on the email server. The storage required for an email may be quite large, especially if its attachments are sizeable. This is compounded if the same email is addressed to multiple recipients. In this case, the storage required for the email is equal to the number of recipients multiplied by the size of the email.

In many workgroups, such as an organization with a dedicated email server, the email server provides several individual email accounts. If the same email is transmitted to multiple accounts in the organization, it is stored separately on the same email server for individual email accounts. This results in duplication of content and increased requirement of storage space.

This increased storage requirement, for emails addressed to multiple recipients, is unnecessary and can lead to wasteful expenditure for maintaining excessive storage capacities.

Similarly, storage requirements may also be increased in the case of data servers, file servers, and other storage systems, where the same files or data may be duplicated at multiple locations.

DETAILED DESCRIPTION OF EMBODIMENTS OF THE INVENTION

Embodiments of the invention provide a method, a system, a machine-readable medium, and an apparatus for managing storage on a shared storage space, for example, on an email server. New data, for storing on the shared storage space, is compared with pre-existing stored data. If any pre-existing stored data matches the new data, then a link to the pre-existing data is inserted in place of the new data. Further, access to the new data is enabled via the inserted link to the pre-existing data.

Figure 1:
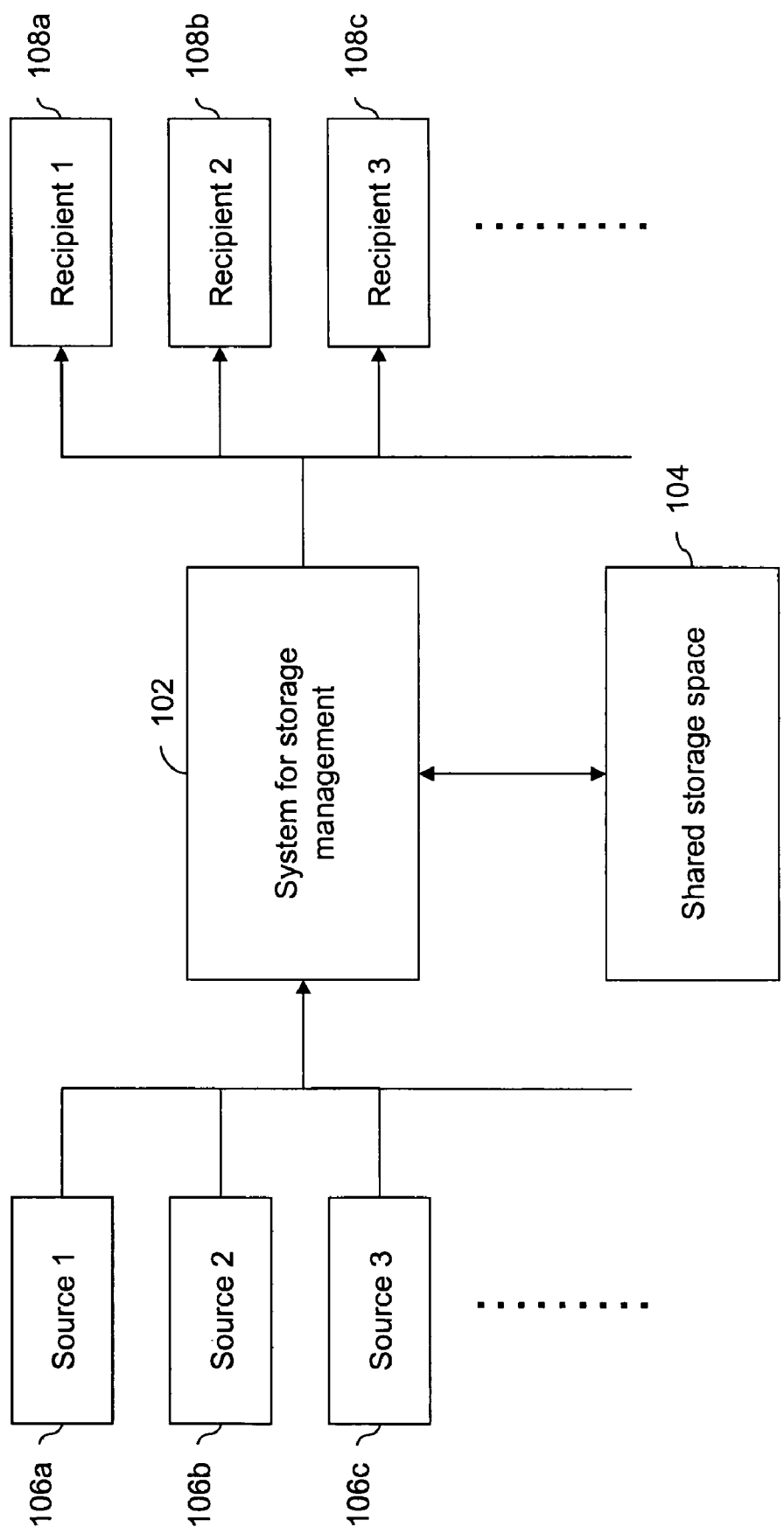
FIG. 1 illustrates a system environment for managing storage on a shared storage space, according to an exemplary embodiment of the invention.

FIG. 1 illustrates a system environment for managing storage on a shared storage space, according to an exemplary embodiment of the invention. A system 102 manages storage of data on a shared storage space 104. New data for storage on shared storage space 104 can be provided to system 102 by sources 106a, 106b and 106c. Further, data can be accessed from shared storage space 104, by recipients 108a, 108b and 108c through system 102.

The number of sources that can store data on shared storage space 104 is not limited by the invention. The depiction of three sources in FIG. 1 is only for the purpose of illustration. The number of sources that can provide data to system 102 can be one or more. Similarly, one or more recipients can access data through system 102. Further, sources and recipients of data can overlap and need not be mutually exclusive. An individual who acts as a source while saving new data can also act as a recipient while accessing data on the shared storage space 104.

In various embodiments of the invention, sources 106 can be individuals. In various other embodiments of the invention, sources 106 can be automatic or background computer processes and systems that need to store data on shared storage space 104. For example, in an embodiment, source 106a can be an anti-virus program that stores a log on a shared storage dump. Similarly, recipients 108 can also be individuals or background computer processes.

In various embodiments of the invention, shared storage space 104 can be an email server, a data server, a web server, a storage dump, and so forth. In various embodiments of the invention, where shared storage space 104 is an email server, the data can be emails. Sources 106 that provide new data can be senders of emails, and recipients 108 can be recipients of the emails.

Figure 2:
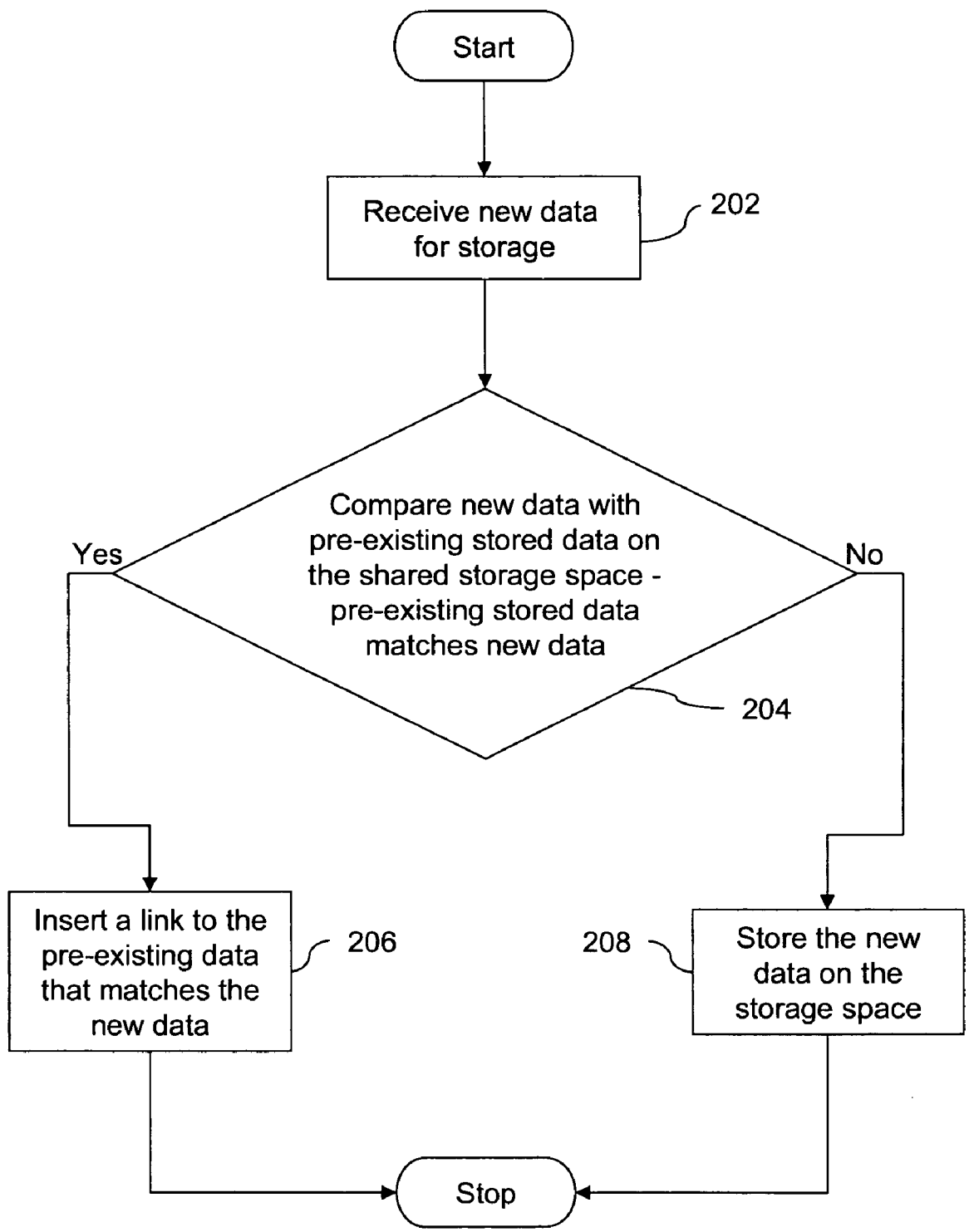
FIG. 2 illustrates a method for managing storage on a shared storage space, according to an exemplary embodiment of the invention.

FIG. 2 illustrates a method for managing storage on a shared storage space, according to an exemplary embodiment of the invention. At step 202, new data for storage on shared storage space 104 is received by system 102 from sources 106. At step 204, new data is compared with pre-existing stored data on shared storage space 104. If any pre-existing stored data matches the new data, then at step 206, a link to the pre-existing data that matches the new data is inserted instead of the new data. The link can then be used by recipients 108 to access the new data. If no pre-existing data on shared storage space 104 matches the new data, then at step 208, the new data is stored directly on shared storage space 104.

The new data received for storage is compared by system 102 with pre-existing stored data on shared storage space 104. In various embodiments of the invention, where shared storage space 104 is a file server that stores different files, new files that are to be stored on shared storage space 104 can be compared with pre-existing stored files. In various embodiments, files with similar names can be compared for similarity in their content. In various other embodiments, files with different file names can also be compared with each other for similarity in their content.

In various embodiments of the invention, the comparison can be binary, text-based, or use any other technique. In various embodiments of the invention, the comparison can be performed using an individual method. In various other embodiments, a combination of two or more methods can be used for the comparison. In various embodiments of the invention the method for comparison can include using hash values. In various other embodiments, the comparison can be performed using message digest fingerprints. However, the invention is not limited to the above mentioned methods for comparison.

If the comparison finds any pre-existing stored data that matches the new data, then at step 206, a link to the preexisting data is inserted instead of the new data. In various embodiments of the invention, where shared storage space 104 is a file server with a hierarchal directory structure, a separate entry in the directory structure can be inserted for the new file. The separate entry can however be linked to the storage location of the matching pre-existing file. In various other embodiments of the invention, the link to the pre-existing data can be a universal resource locator (URL).

If a link to the matching pre-existing stored data is inserted instead of the new data, access to recipients 108 is provided via the inserted link. In various embodiments, the link can be visible to recipients 108, and activating the link can lead to the required data. In various other embodiments, the link may function transparently for recipients 108. In this case, recipients 108 can be provided access to the stored data without being aware of whether the data is stored as a link or directly on shared storage space 104.

Various embodiments of the invention, where the shared storage space is an email server, are hereinafter described in detail. However, this description is only for illustration purposes and is not intended to limit the scope of the invention.

Figure 3:
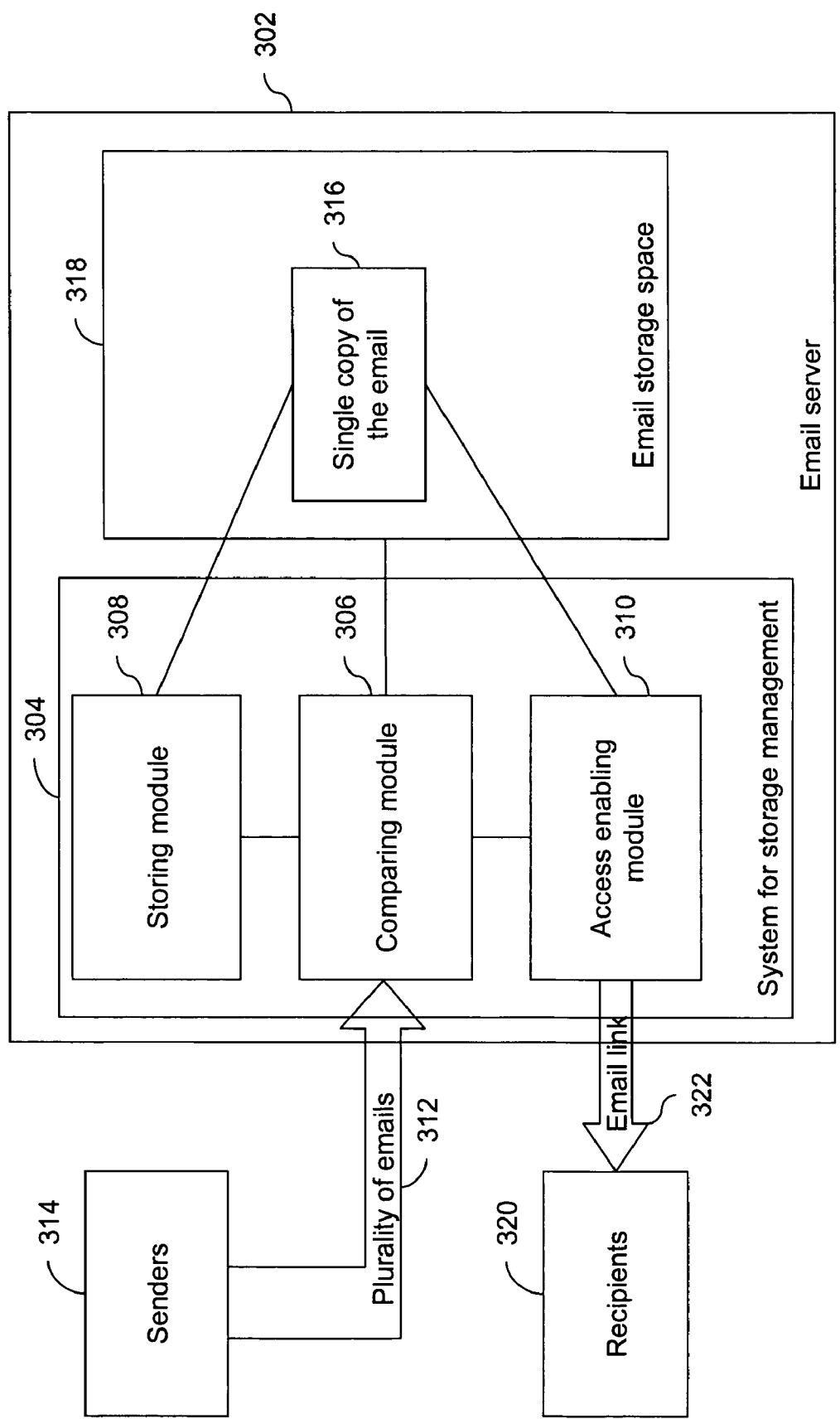
FIG. 3 illustrates a system for managing storage on an email server, according to an exemplary embodiment of the invention.

FIG. 3 illustrates a system for managing storage on an email server, according to an exemplary embodiment of the invention. An email server 302 includes a system 304 for storage management. System 304 includes a comparing module 306, a storing module 308, and an access-enabling module 310. In various embodiments of the invention, each of the modules in system 304 can be implemented as software, firmware, or a combination thereof.

Comparing module 306 compares the content of a plurality of emails 312. If the content of each of plurality of emails 312 is the same, only one copy of plurality of emails 312 is stored as a single copy 316 in an email storage space 318. Each of recipients 320 of plurality of emails 312 is enabled access to the email by access-enabling module 310 via a link 322 to single copy 316 of the plurality of emails. Further, system 304 can be given appropriate rights so as to enable it to write and access data from email storage space 318.

In various embodiments of the invention, plurality of emails 312 can be sent by one or more senders 314. Similarly, in various embodiments of the invention, plurality of emails 312 can be received by one or more recipients 320. Any number of senders and recipients can be involved, without diverting from the scope and spirit of the invention. In various embodiments of the invention, one or more senders 314 can send plurality of emails 312 to one or more recipients 320. If the content of plurality of emails 312 is the same, then only one copy of the email is stored as single copy 316 on email storing space 318. Each of recipients 320 of plurality of emails 312 can then access the content of the email via link 322.

In various embodiments of the invention, plurality of emails 312 need not be sent at the same time. Each of the plurality of emails 312 can be sent at different times. In this case, comparing module 306 can compares new emails with pre-existing emails stored in email storage space 318. If the content of the new email matches that of the pre-existing stored emails, then a link to the pre-existing matching emails can be provided instead of the actual content, i.e., the actual content is removed and the link to the content stored on email server 302 is inserted. Hence, a comparison of the content of plurality of emails 312 need not be limited to emails that arrive simultaneously. If the content of a new email matches that of a pre-existing email, then both the emails can be stored as single copy 316, and each of recipients 320 of the email can be provided with link 322, enabling access to the email.

In various embodiments of the invention, email server 302 can be dedicated for an organization. In this case, email server 302 can have access restricted to senders 314 and recipients 320 from within the organization only. In various embodiments, email server 302 can be Internet-based and can enable any individual to open an email account through the Internet. In this case, access can be enabled for senders 314 and recipients 320 from all over the Internet.

In various embodiments of the invention, email server 302 can enable sending and receiving emails through hypertext markup language (HTML)-based web browsing. In various embodiments, the protocol for sending and receiving emails can be post office protocol (POP) and simple mail transfer protocol (SMTP). In an embodiment, email server 302 can be a Microsoft Exchange server. In various embodiments of the invention, email server 302 can provide various other protocols for sending and receiving emails. In various embodiments of the invention, email server 302 can also provide a combination of two or more protocols for sending and receiving emails.

Further, the depiction of system 304 inside email server 302 is only for illustration purposes and does not limit the scope of the invention. In various embodiments of the invention, system 304 for storage management on email server 302 can lie outside email server 302 and can be a separate software, hardware, etc., that fulfils the purpose of the invention. Similarly, in various embodiments of the invention, email storage space 318 need not be inside email server 302, and can be any shared storage space utilized for the purpose of storing emails.

Additionally, in various embodiments of the invention, a size limit can be defined for comparing and storing plurality of emails 312 as single copy 316. In various embodiments, plurality of emails 312 can be compared if the size of the email is above a pre-defined size limit. Similarly, in various embodiments, plurality of emails 312 can be compared if the size of the email is below a pre-defined size limit. In various embodiments of the invention, the pre-defined size limit can be programmed into system 304 by a system administrator of email server 302. In various embodiments, the size limit can be decided by senders 314. Each of senders 314 can decide the size limit for the emails sent by them. Similarly, in an embodiment, the size limit can be decided by each of recipients 320, for the emails received by them. In an embodiment of the invention, system 304 can be programmed to store only one copy of all the emails that have the same content as single copy 316, regardless of its size. In an embodiment of the invention, senders 314 or recipients 320 can disable storage as a single copy for specific emails.

Figure 4:
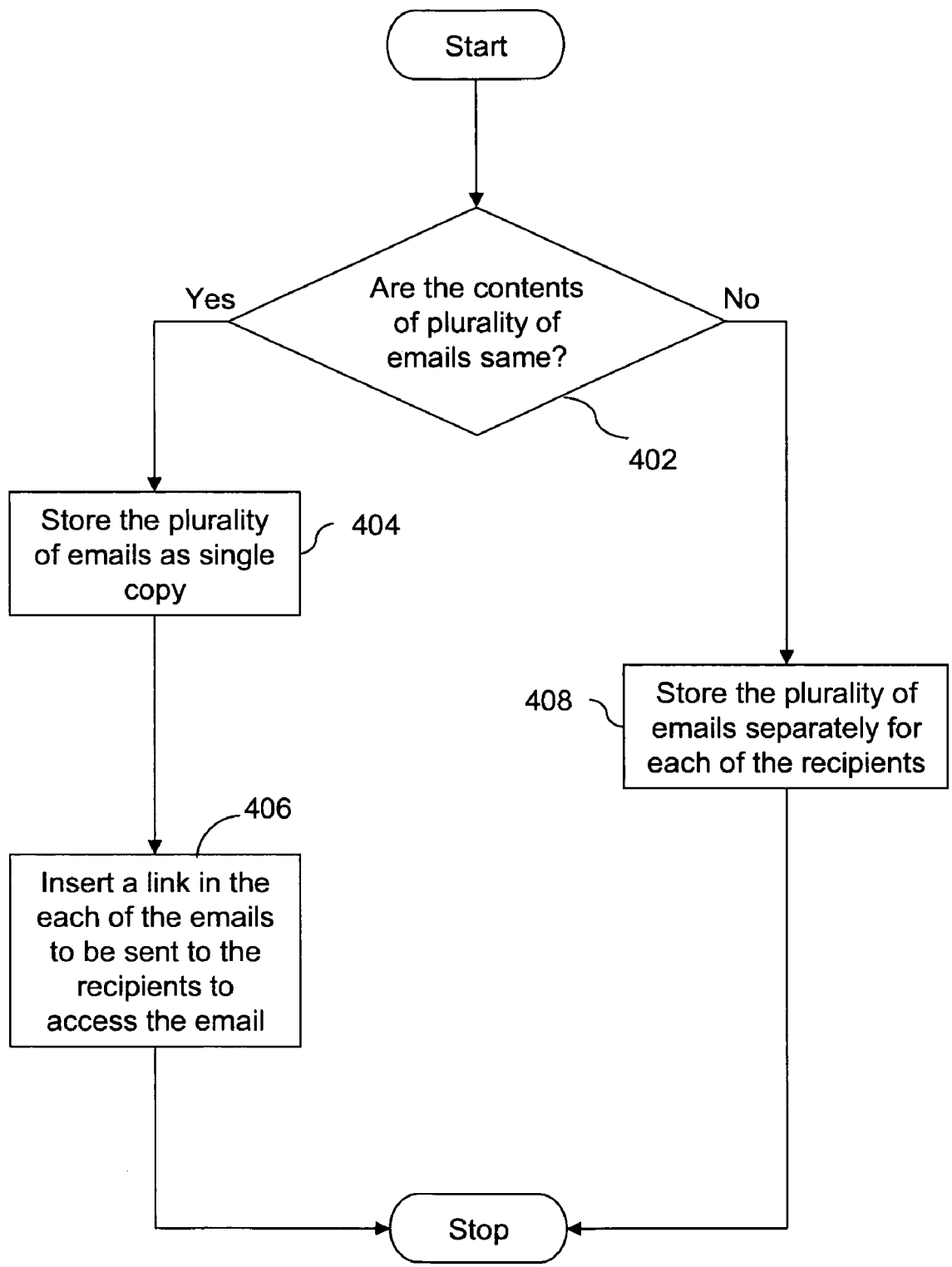
FIG. 4 illustrates a method for managing storage on an email server, according to an exemplary embodiment of the invention.

FIG. 4 illustrates a method for managing storage on an email server, according to an exemplary embodiment of the invention. At step 402, comparing module 306 compares the content of each of plurality of emails 312. If the content of each of plurality of emails 312 is the same, then they are stored as single copy 316 on email storage space 318 at step 404. Further, at step 406, each of recipients 320 of plurality of emails 312 is enabled access to the email via link 322 to single copy 316. If the content of each of the plurality of emails is not the same, then at step 408, the emails are stored separately in email storing space 318 for each of recipients 320.

In various embodiments of the invention, the comparison of the content of each of plurality of emails 312 can include comparison of the body, as well as each of the attachments of plurality of emails 312. In this case, plurality of emails 312 can be stored as single copy 316, if the body and attachments of plurality of emails 312 is the same. Both the body as well as the attachments of plurality of emails 312 can then be stored as single copy 316.

In various embodiments of the invention, if only the body of each of plurality of emails 312 is the same, then the body of plurality of emails 312 can be stored as single copy 316. The attachments can then be stored separately for each of recipients 320. Further, link 322 to single copy 316 can provide additional information about the attachments of the email for each of recipients 320.

In various embodiments of the invention, link 322 that enables access to the email can be a URL pointing to the storage location of single copy 316. In this case, each of recipients 320 can access the email by activating link 322. In various other embodiments, link 322 can function transparently for recipients 320. In this case, link 322 can be activated automatically when any of recipients 320 tries to access the email. Further, each of recipients 320 can be enabled access to the email without knowledge of its storage as single copy 316.

In various embodiments of the invention, enabling access for recipients 320 to the email or the attachment can also include verifying the security authorizations of each of the recipients 320 prior to enabling access. In various embodiments, access-enabling module 310 can include a verification module for verifying the security authorization. In various embodiments, the security authorization that is verified can be the same as the security authorization that is verified to store and access emails even when system 304 is not used. Further, storage of emails or attachments as a single copy can be in an encrypted form. In this case, an intrusion attempt or attack on email storage space 318 may not compromise the stored emails or attachments.

Figure 5:
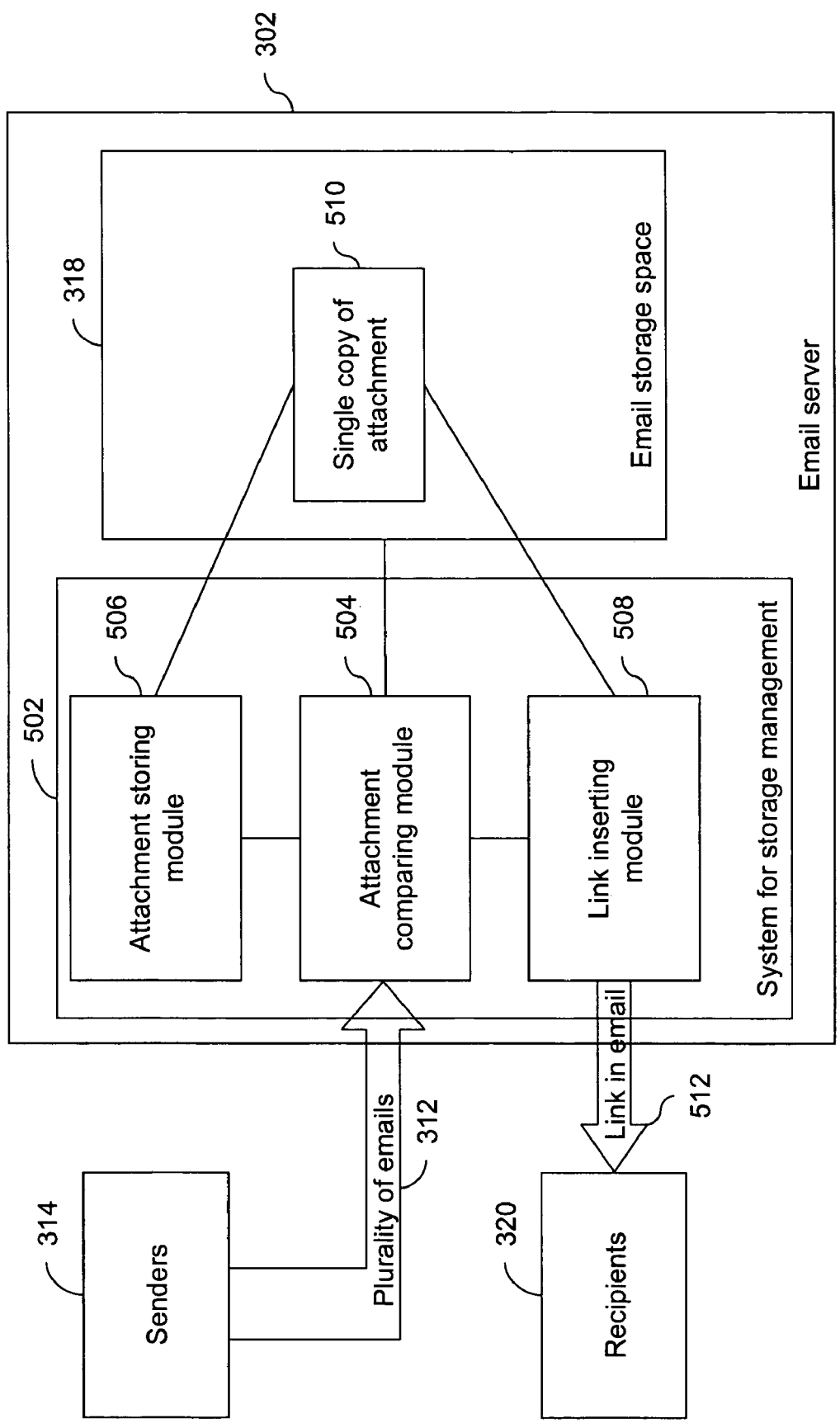
FIG. 5 illustrates a system for storing attachments of emails, according to various embodiments of the invention.

In various embodiments of the invention, one or more attachments of plurality of emails 312 can be compared, even if the body of each of plurality of emails 312 is not the same. FIG. 5 illustrates a system for storing attachments of emails, according to various embodiments of the invention. Email server 302 includes a system 502 for storage of attachments of emails. System 502 includes an attachment comparing module 504, an attachment storing module 506, and a link inserting module 508. In various embodiments of the invention, each of the modules in system 502 can be implemented as software, firmware, or a combination thereof.

Figure 6:
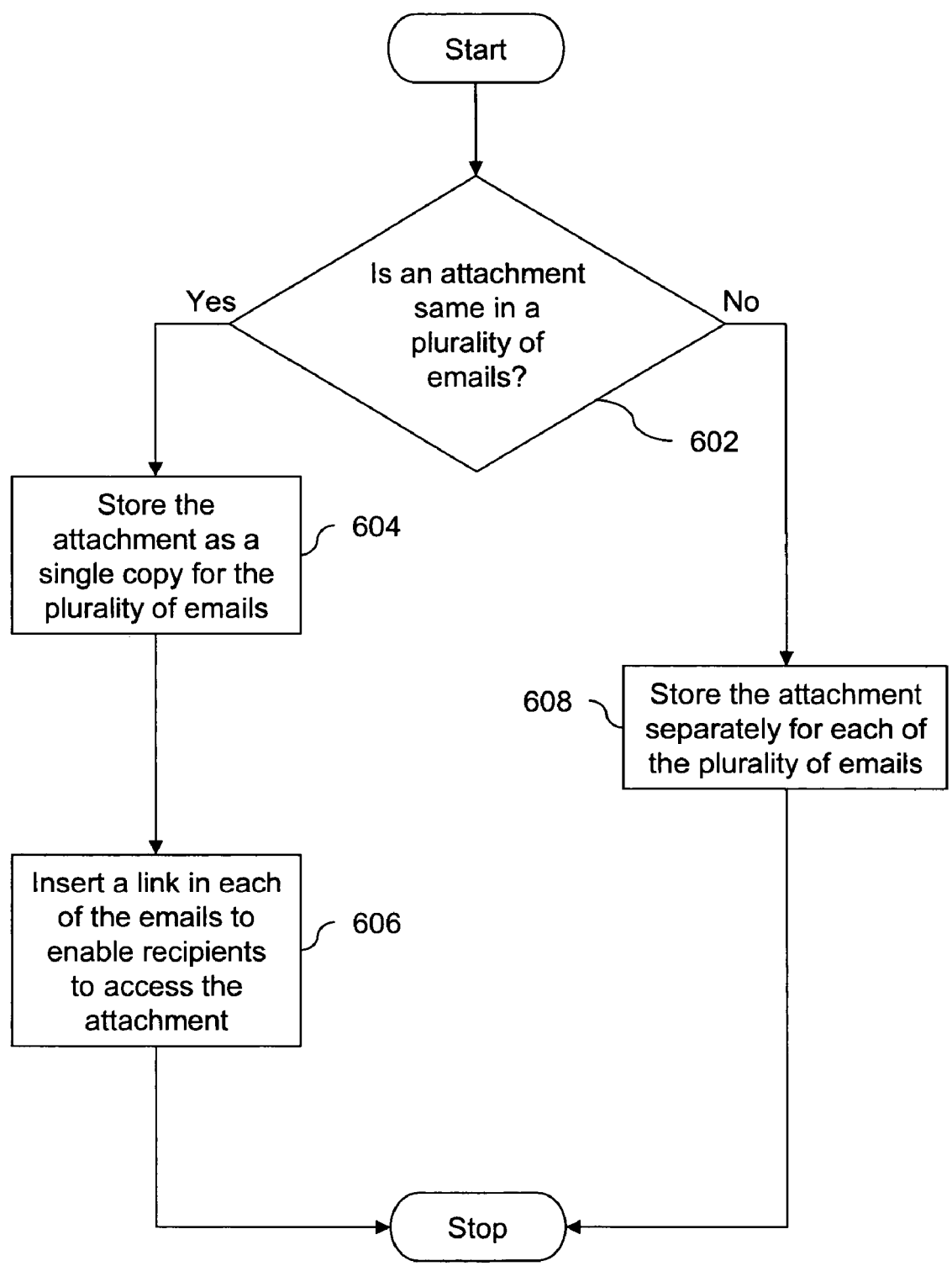
FIG. 6 illustrates a method for storing attachments of emails, according to various embodiments of the invention.

FIG. 6 illustrates a method for storing attachments of emails, according to various embodiments of the invention. At step 602, an attachment in each of plurality of emails 312 is compared. At step 604, the attachment is stored as single copy 510, if the attachment is the same in at least two of plurality of emails 312. At step 606, a link 512 is inserted in each the emails of plurality of emails 312 that include the same attachment. This enables recipients 320 to access the attachment from single copy 510. At step 608, the attachment is stored separately if the attachment is different in the each of plurality of emails 312.

In various embodiments of the invention, attachment comparing module 504 can compare the attachment in each of plurality of emails 312. In various other embodiments of the invention, comparing module 306 can be enabled to make this comparison. If the attachment is the same in at least two of plurality of emails 312, then the attachment is stored as single copy 510 on email storage space 318. In various embodiments of the invention, the attachment can be stored as single copy 510 by attachment storing module 506. In various other embodiments, storing module 308 can store the attachment as single copy 510. Access to the attachment from single copy 510 is then enabled via link 512 inserted in each of plurality of emails 312 that include the same attachment. In various embodiments of the invention, link 512 can be inserted in each of plurality of emails 312 by link-inserting module 508. In various other embodiments, link 512 can also be inserted in each of plurality of emails 312 by access-enabling module 310.

In various embodiments of the invention, link 512 can be a URL pointing to the storage location of single copy 510. In this case, each of recipients 320 can access the attachment by activating link 512. In various other embodiments, link 512 can function transparently for recipients 320. In this case, link 512 can be activated automatically when any of recipients 320 tries to access the attachment. Further, each of recipients 320 can be enabled access to the attachment without knowledge of its storage as single copy 510.

To summarize, embodiments of the invention provide effective storage management of a shared storage space. A single copy of duplicate data being send by one or more sources is stored on the shared storage space, even if it has been sent by one or more sources at different times. Hence, duplicate data need not be stored at more than one location on the shared storage space, and wastage of storage space can be avoided. Further, storage management can function transparently, and individuals storing or retrieving data from the shared storage space need not be aware of the method of storage. Alternatively, individuals can be authorized to disable storage of specific data as a single copy, even if the specific data is duplicated. Additionally, appropriate security authorization of individuals can be verified before enabling access to the data stored as a single copy.

Although the invention has been discussed with respect to specific embodiments thereof, these embodiments are merely illustrative, and not restrictive, of the invention. For example, even though the invention has been described in detail with respect to an email server, the scope of the invention covers storage management of all shared storage spaces, including but not limited to data servers, file servers, web servers, and so forth.

Although specific protocols and methods of communication such as the Internet and web page have been used to describe embodiments, other embodiments can use other transmission protocols or standards. The use of the terms 'peer', 'client' and 'server' can include any type of device, operation or other process. The present invention can operate between any two processes or entities, including users, devices, functional systems, or combinations of hardware and software. Peer-to-peer networks and any other networks or systems, where the roles of client and server are switched, change dynamically or are not even present, are within the scope of the invention.

Any suitable programming language can be used to implement the routines of the present invention including C, C++, JAVA language, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for managing storage on an email server, the method comprising:
   comparing content of a plurality of emails to pre-existing data, wherein the content comprises both content from the bodies of the emails and any attachments of the emails, and wherein the comparing is performed even if the bodies of the plurality of emails are not the same;
   if content of each of the plurality of emails is the same, then storing the plurality of emails as a single copy;

removing actual content from the plurality of emails if any pre-existing matches the content;

inserting a link to the pre-existing data if any pre-existing data matches the content; and enabling each of the recipients of the plurality of emails to access the email via a link to the single copy, wherein the link is activated automatically when a given recipient accesses the email such that recipients are not aware that the pre-existing data is stored as a link.

2. The method of claim 1, wherein enabling each of the recipients of the plurality of emails to access the email comprises verifying the security authorizations of each of the recipients of the plurality of emails.

3. The method of claim 1, further comprising comparing one or more attachments of the plurality of emails;

if an attachment is same in each of the plurality of emails, then storing a single copy of the attachment; and inserting, in each of the plurality of emails, a link that enables access to the attachment from the single copy.

4. The method of claim 1, wherein the plurality of emails are sent from a plurality of senders to one or more recipients, and wherein each of the plurality of emails is sent at a different time.

5. The method of claim 1, wherein the plurality of emails is stored as a single copy, if the size of the email is within a pre-defined size limit.

6. The method of claim 5, wherein the pre-defined size limit for the email is determined, based on at least one of: the choice of the senders, the choice of the recipients, and conditions programmed into the email server by the administrator of the email server.

7. A system for managing storage on an email server, the system comprising:

a comparing module for comparing content of a plurality of emails to pre-existing data, wherein the content comprises both content from the bodies of the emails and any attachments of the emails, and wherein the comparing is performed even if the bodies of the plurality of emails are not the same;

a storing module for storing the plurality of emails as a single copy, the plurality of emails being stored as a single copy if each of the plurality of emails is the same; and removing actual content from the plurality of emails if any pre-existing matches the content;

inserting a link to the pre-existing data if any pre-existing matches the content;

an access-enabling module for enabling each of the recipients of the plurality of emails to access the email via a link to the single copy, wherein the link is activated automatically when a given recipient accesses the email such that recipients are not aware that the pre-existing data is stored as a link.

8. The system of claim 7, wherein the access-enabling module comprises a verification module for verifying the security authorizations of each of the recipients of the plurality of emails.

9. The system of claim 7, further comprising:

an attachment-comparing module for comparing one or more attachments of the plurality of emails; and a link-inserting module for inserting, in each of the plurality of emails, a link that enables access to the attachment from the single copy.

10. The system of claim 7, wherein the plurality of emails are sent from one or more senders to one or more recipients.

11. The system of claim 7, wherein the plurality of emails is stored as a single copy, if the size of the email is within a pre-defined size limit.

12. The system of claim 11, wherein the pre-defined size limit for the email is determined, based on at least one of: the choice of the senders, the choice of the recipients, and conditions programmed into the email server by the administrator of the email server.

13. A machine-readable storage medium including instructions for managing storage on an email server, the storage medium comprising one or more instructions for:

comparing content of a plurality of emails to pre-existing data, wherein the content comprises both content from the bodies of the emails and any attachments of the emails, and wherein the comparing is performed even if the bodies of the plurality of emails are not the same;

storing the plurality of emails as a single copy, if content of each of the plurality of emails is the same;

removing actual content from the plurality of emails if any pre-existing matches the content;

inserting a link to the pre-existing data if any pre-existing matches the content; and enabling each of the recipients of the plurality of emails to access the email via a link to the single copy, wherein the link is activated automatically when a given recipient accesses the email such that recipients are not aware that the pre-existing data is stored as a link.

14. An apparatus for managing storage on an email server, the apparatus comprising:

a processing system including a processor coupled to a display and user input device;

a machine-readable storage medium including instructions for managing storage on an email server, the storage medium comprising one or more instructions for:

comparing content of a plurality of emails to pre-existing data, wherein the content comprises both content from the bodies of the emails and any attachments of the emails, and wherein the comparing is performed even if the bodies of the plurality of emails are not the same;

storing the plurality of emails as a single copy, if content of each of the plurality of emails is the same;

removing actual content from the plurality of emails if any pre-existing matches the content;

inserting a link to the pre-existing data if any pre-existing data matches the content; and enabling each of the recipients of the plurality of emails to access the email via a link to the single copy, wherein the link is activated automatically when a given recipient accesses the email such that recipients are not aware that the pre-existing data is stored as a link.

* * * * *

UNITED STATES PATENT AND TRADEMARK OFFICE
CERTIFICATE OF CORRECTION

PATENT NO. : 7,650,387 B2  Page 1 of 1
APPLICATION NO. : 11/280556
DATED : January 19, 2010
INVENTOR(S) : Foo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this

Twenty-eighth Day of December, 2010

David J. Kappos
*Director of the United States Patent and Trademark Office*